INVENTOR
Irwin B. Thierman

AGENT

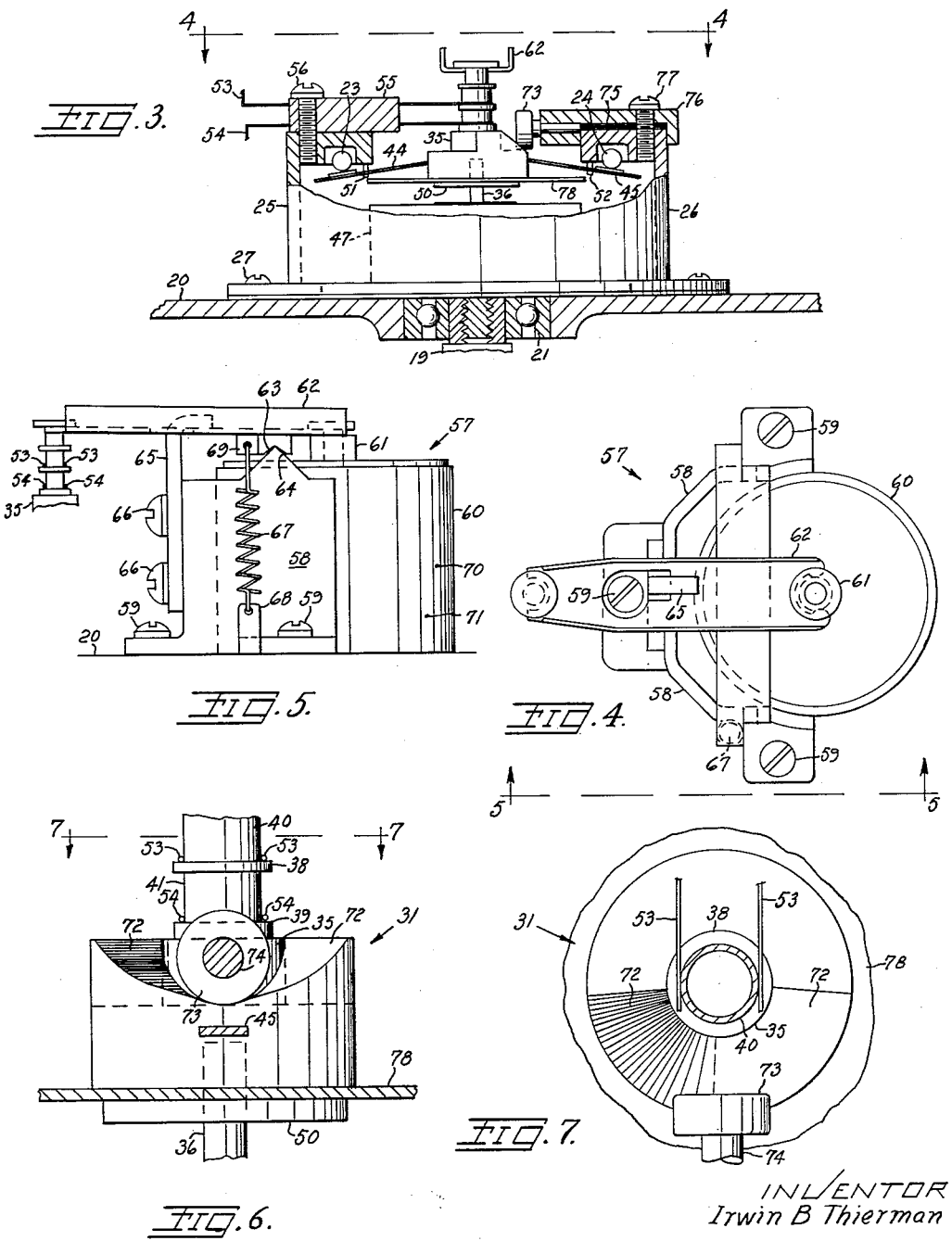

United States Patent Office 3,012,440
Patented Dec. 12, 1961

3,012,440
DIRECTIONAL GYRO
Irwin B. Thierman, Portland, Oreg., assignor to Iron Fireman Manufacturing Company, a corporation of Oregon
Filed Feb. 21, 1961, Ser. No. 90,810
1 Claim. (Cl. 74—5.43)

This invention relates generally to gyroscopic instruments and more particularly to a directional gyro used for signalling to an associated course correction mechanism the right or left variation from a set course which a self powered vehicle may be taking about the axis of the outer gimbal ring axle of the gyro.

The directional gyro is essentially a free gyro including a wheel hung in a pair of gimbal rings to have freedom of motion about its spin axle supported in an inner gimbal ring with freedom of motion about the inner gimbal ring axle supported in an outer gimbal ring with freedom of motion about the outer gimbal ring axle supported on a frame which in turn is secured to a vehicle whose direction of travel is to be indicated or controlled.

When a free gyro is caged, the spin axle, the inner gimbal axle, and the outer gimbal axle must each be perpendicular to the other and their three axes must intersect each other at a point. The directional gyro must be secured to the vehicle so that when the gyro is in effective operation with its wheel up to speed and the vehicle is travelling on its preset course, the axis of the outer gimbal ring is perpendicular to the preset course and the wheel or spin axis is perpendicular to the outer gimbal ring axis. Once the wheel is up to speed in space, by its nature the wheel or spin axis will tend to maintain its direction in space so that if the gyro is set in motion on a straight selected course normal to the outer gimbal ring axis, thereafter any variation from the selected course which the gyro may take will show as a change of the angular position of the gyro frame about the axis of the outer gimbal ring.

With the directional gyro, angular movement about a vertical axis can be indicated by fixing a compass card or angular degree scale to the gyro frame about the vertical gimbal axis and by fixing a cooperating pointer to the vertical gimbal ring about the axis of which the gyro frame is free to move as the air frame drifts off its set course. For this simple use the indicating pointer will always be stationary on the set course and variations to either side of the set course will be visually apparent on the compass card so that the pilot can manually steer the vehicle back onto its course.

However when the vehicle is a drone or a remotely guided missile or a self guided missile it is necessary for the gyro continuously to signal the instantaneous course condition of the vehicle to a course correction steering mechanism on the vehicle.

It is the primary object of this invention to provide a directional gyro with means for electrically detecting the instantaneous variations from a set course made by a dirigible vehicle with which the gyro is operatively attached and means for signalling the detected course variations to the steering mechanism of the vehicle to steer the vehicle back to its set course.

It is a second object to provide such a gyro with electric means for detecting the variations from course made by a vehicle with which the gyro is operatively associated and means for signalling the detected course variations to a course correction mechanism on the vehicle.

It is a third object to provide such a gyro with a potentiometer resistance winding insulatedly mounted on the frame of the gyro coaxially with the upper end of the vertical gimbal ring axle and a wiping contact for the potentiometer winding removably secured on the upper end of said vertical gimbal axle.

It is a fourth object to provide such a gyro with a toroidal permanent magnet secured on the frame of the gyro concentric with the upper end of the vertical gimbal axle.

It is a fifth object to provide such a gyro with an insulating carrier means for said potentiometer wiper frictionlessly piloted for both rotary and axial motion concentrically in the upper end of the vertical gimbal axle.

It is a sixth object to provide such a gyro with such a wiper contact carrier formed with a frictional lower central surface to engage the upper central surface of the vertical gimbal axle, the wiper carrier including a magnetic washer secured thereon around said frictional surface to be magnetically engaged by said toroidal magnet releasably to secure together said gyro frame, said vertical gimbal axle and said wiper contact carrier.

It is a seventh object to provide such a gyro with an electrically conducting flexible potentiometer wiper blade with one end secured into said carrier to extend radially outwardly therefrom and the outer end of said blade having said wiper secured thereon to engage said potentiometer winding at all times.

It is an eighth object to provide such a gyro with a solenoid operated means axially engageable coaxially with said wiper carrier together with means for energizing said solenoid means to lift said wiper carrier with said magnetic washer away from the permanent magnet to release the contact carrier from both the gyro frame and the vertical gimbal.

It is a ninth object to provide such a gyro with such a wiper carrier having a face cam surface sunk downwardly into a selected part of the top face thereof symmetrically about a vertical plane including said wiper and said axis of said vertical gimbal.

It is a tenth object to provide such a gyro with such a face cam means and a cam follower radially supported on the gyro frame to intercept said cam face within the angular extent of said cam face on either side of said plane as said solenoid means raises said carrier to engage said follower and thereby causes said carrier to rotate about the axis of said vertical gimbal to come to rest with said cam follower centered in said plane.

It is an eleventh object to provide the foregoing gyro with the foregoing means for disengaging its said carrier of said potentiometer wiper from connection with said vertical gimbal ring and said frame, then rotating said carrier about said vertical gimbal axis to a position of electrical alignment of said potentiometer wiper with a preset zero position on said potentiometer and then at that position, reconnecting said carrier to said vertical gimbal continuously to signal the variation of the angular position of the gyro frame with respect to the preset zero position of the vertical gimbal ring about its axis. It is a twelfth object of this invention to provide such a directional gyro with automatic means for continuously erecting the spin axis of the gyro toward perpendicularity with the vertical gimbal axis which is installed in the vehicle to be in a vertical position when the airframe is in level flight in a preset direction.

It is a thirteenth object to provide such a gyro with an inner gimbal ring forming an air plenum chamber, means for keeping the chamber supplied with air under pressure and a pair of parallel reaction air jets formed through diametrically opposite walls of said chamber to emit air therefrom in opposite directions in a plane perpendicular to the spin axis, said jets in said plane being equidistant from said horizontal gimbal axis whereby when the spin axis falls away from perpendicularity with the vertical gimbal axis the reactions of said two jets will form a couple about said vertical gimbal axis to cause said horizontal gimbal to precess about said horizontal gimbal axis toward perpendicularity with said vertical gimbal axis.

How these and other objects are obtained is made clear in the following description referring to the attached drawing in which:

FIG. 3 is a fragmental enlargement of the upper part of FIG. 2 but showing the potentiometer wiper support freed from the vertical gimbal ring and cam positioned with the potentiometer wiper set on the zero position of the potentiometer.

FIG. 4 is a fragmental top plan along the line 4—4 of FIG. 3.

FIG. 5 is a fragmental side elevation viewed from line 5—5 of FIG. 4.

FIG. 6 is a fragmental side elevation viewed from line 6—6 of FIG. 8.

FIG. 7 is a fragmental top plan in partial section viewed from line 7—7 of FIG. 6.

Figure 1:
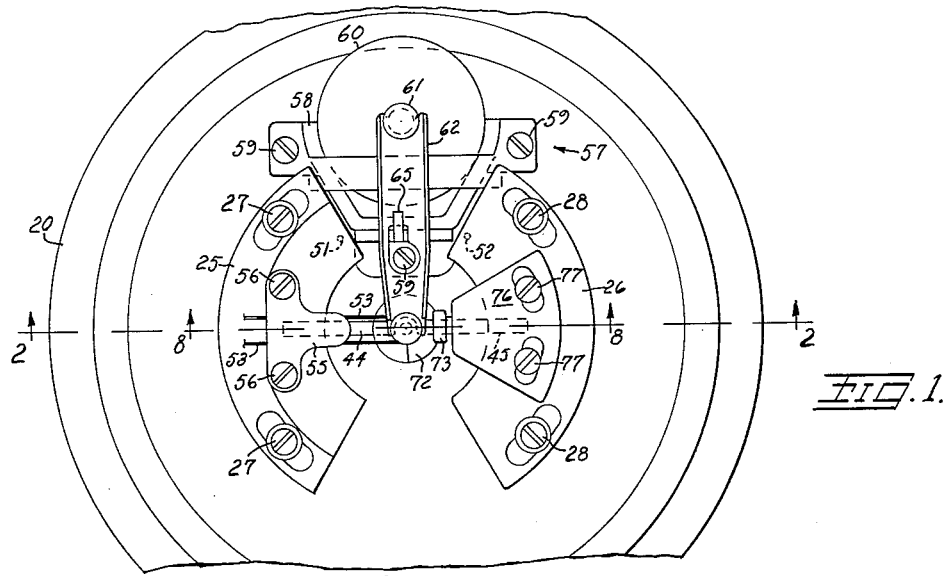
FIG. 1 is a fragmentary top plan view of the directional gyro of this invention with parts broken away to show the cam and cam follower used to set the potentiometer wiper of the vertical gimbal of the gyro onto the zero position of the potentiometer winding of the gyro frame.

It should be remembered particularly that the device of this invention is a particular form of directional gyro the purpose of which is to sense the departure from its preset course of a vehicle to which the gyro is attached and to signal such departure to a course correction steering means for the vehicle which is no part of this invention.

To satisfy the requirements of operation of a directional gyro its three axles must be mutually perpendicular. Since by construction the inner gimbal axis is always perpendicular to the outer gimbal axis and the inner gimbal axis is always perpendicular to the spin axis and all three axes meet in a point the gyro will be continuously erected for use if some means is found for continuously erecting the spin axis to the outer gimbal axis.

Again since it is required that a directional gyro be so installed in a vehicle whose directional motion is to be sensed that, when the vehicle is in motion in the preset direction of motion, the outer gimbal axis will be normal to the preset direction, the spin axis will be normal to the outer gimbal ring axis, and the gyro can be maintained in proper operating condition by continuously erecting the spin axis to the outer gimbal axis.

The present novel and preferred method for continuously erecting the spin axis to the outer gimbal axis is made possible by the present gyro construction which is generally similar to the construction of the vertical gyro disclosed in U.S. Patent No. 2,772,570, issued December 4, 1956, as assigned to the Iron Fireman Manufacturing Company, assignee of all rights in the present invention.

Referring now to the drawing, the inner gimbal ring of the gyro comprises a hollow case 11 within which is supported for rotation about a spin axis 12 an electric motor, not shown, driving a wheel, not shown, including an air fan, not shown, which takes air through an inlet, not shown, into the case 11 in sufficient volume to maintain the air therein at a sufficient pressure continuously to emit the air out from case 11 through air jets 13, 14 with sufficient reaction momentum for our purpose. Inner gimbal axles 15 of case 11 are supported in outer gimbal ring 16 on inner gimbal case bearings 17 for rotation in either direction about inner gimbal ring axis 18.

Outer gimbal ring axles 19 of outer gimbal ring 16 are supported in frame 20 on outer gimbal ring bearings 21 for rotation in either direction about outer gimbal ring axis 22. Frame 20 is rigidly secured by means, not shown, to a vehicle, not shown, in such a manner that when the vehicle is in motion in a preset direction, the outer gimbal 22 is perpendicular to said direction and the spin axis is perpendicular to said outer gimbal ring axis 22.

The vehicle with the gyro frame 20 is free to rotate on outer gimbal axis 22 in either direction about case 11, which includes the gyro wheel spinning on axis 12. Also the vehicle with gyro frame 20 and outer gimbal ring 16 is free to rotate on inner gimbal axis 18 in either direction about case 11 which includes the gyro wheel spinning on axis 12.

Air jets 13 and 14 are of equal air emission capability and each of them continuously emit air at the same rate but in parallel opposite directions in the same plane perpendicular to the spin axis 12 whereby jets 13 and 14 will exert opposite reaction forces of equal magnitude and opposite direction about the outer gimbal axis 22.

Then should the spin axis 12 with case 11 move one way or the other from perpendicularity to axis 22 in the plane including axes 12 and 22 the changing lever arms of the forces of jets 13 and 14 about outer gimbal axis 22 will result in a torque on the inner gimbal axis 18 about the outer gimbal axis 22 which will cause the case 11 with the spin axis 12 to precess about the inner gimbal axis 18 back toward its desired perpendicularity of the spin axis 12 with respect to the outer gimbal axis 22.

The provision of the jets 13 and 14 to function as described is an important part of this invention.

With the directional gyro of this invention secured to a vehicle whose steering errors are to be corrected, with the gyro fixed to the vehicle so that the outer gimbal ring axis of the gyro will be perpendicular to the selected line of forward movement of the vehicle, and with the jet means provided for the continuous erection of the outer gimbal ring axis and the spin axis one to the other, it is understood that the line of forward movement of the vehicle will be referenced with respect to an angular position about the outer gimbal ring axis of a plane including both the spin axis and the outer gimbal ring axis and that the reference position will be zero when the line of movement of the vehicle is also in the plane of the spin axis and the outer gimbal ring axis. Also the instantaneous directional angular error is forward movement of the vehicle will be the angular increment about the outer gimbal ring axis by which the line of forward movement of the vehicle moves out of the plane including both the spin axis and the outer gimbal ring axis.

Thus our directional gyro sets up at a rigid center of both the gyro and the vehicle on outer gimbal ring axis to be included in two planes, a first of which will also include the spin axis and the second of which will also include the selected line of forward motion of the vehicle.

The second of the two planes will permanently be positioned on the common frame of the gyro and the vehicle and include the permanently selected line of forward motion of the vehicle, the axis of the outer gimbal ring of the gyro and a neutral or null position of a potentiometer winding secured on the common frame of the gyro and the vehicle.

The first of the two planes will include the outer gimbal ring axis and the radial centerline of a wiper for the potentiometer, the wiper including a carrier therefor and the carrier being rotationally positionable about the outer gimbal ring axis to a position where the potentiometer wiper is at rest on the neutral or null position of the potentiometer winding and will remain in that position even though the frame of the vehicle and the gyro with the winding of the potentiometer rotates the null point of the winding away from the wiper in proportion to the angular drift of the vehicle away from its selected line of forward motion.

A preferred construction for providing the just recited means for setting the null position of the gyro of this invention for its purpose as followed by the use of the potentiometer to signal continuously the extent of error in steering the vehicle along its selected course is seen in the drawing starting with FIGS. 1 to 3 as follows.

Figure 2:
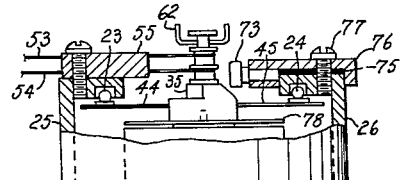
FIG. 2 is a fragmental front elevation in partial section along the line 2—2 of FIG. 1 and showing the potentiometer wiper support part of the gyro magnetically held to the vertical gimbal ring of the gyro to prevent rotation, one with respect to the other about the vertical gimbal axis, one with respect to the other.
Figure 8:
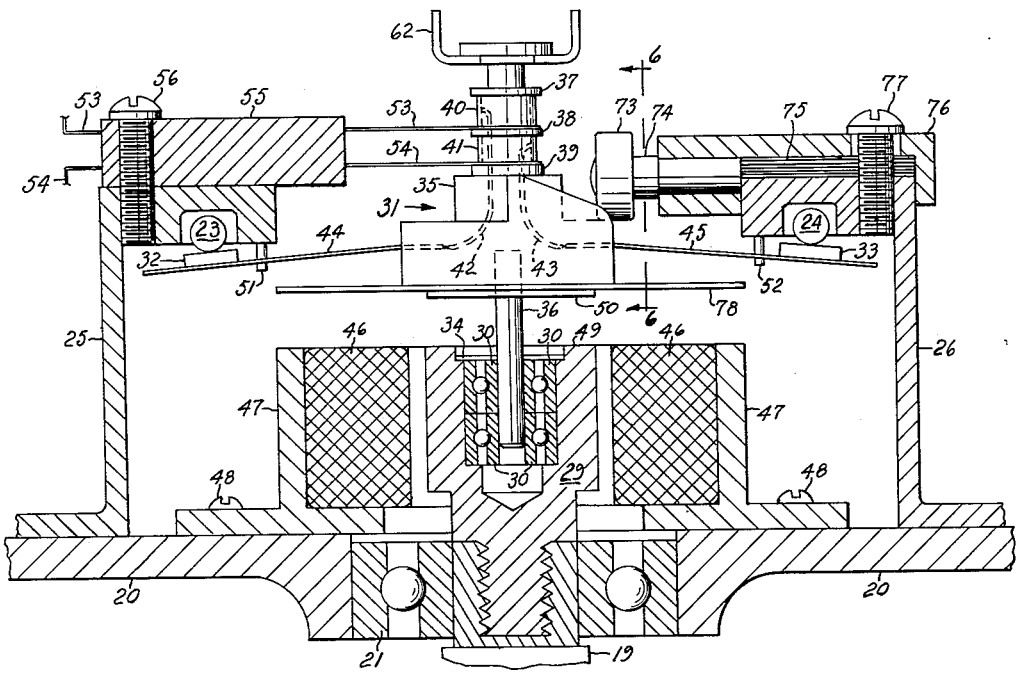
FIG. 8 is an enlarged and additionally sectioned view as seen in FIG. 3.

As seen in FIGS. 1 to 3, a pair of potentiometer windings 23 and 24 are insulatedly supported on their respective brackets 25 and 26 adjustably secured by screws 27, 28 to gyro frame 20.

Threadedly secured axially into the top of outer gimbal ring axle 19 is housing 29 for bearings 30 for carrier 31 for wiper contacts 32, 33 for potentiometer windings 23, 24.

Bearings 30 are secured into housing 29 by snap ring 34. Carrier 31 is formed of an electric insulating part 35 into which is molded a carefully finished metal journal 36 for supporting carrier 31 for free axial or rotary movement in bearings 30. Between annular insulating rings 37, 38, 39 carrier 31 is covered with metal collars 40, 41 connected through holes in the interior of carrier 31 by wires 42, 43 with flexible blades 44, 45 which carry wiper contacts 32, 33, always into contact with potentiometer coils 23, 24.

Toroidal permanent magnet 46 is secured in its retaining cup 47 coaxially with carrier 31. Cup 47 is secured to gyro frame 20 by screws 48 The upper end face 49 of bearing housing 29 and the lower end face 50 of part 35 of wiper carrier 31 are roughened so that when carrier 31 is lowered from its position shown in FIG. 3 to its position shown in FIG. 2 faces 49 of housing 29 and face 50 of carrier 31 are frictionally engaged to the extent required for carrier 31 to rotate wiper contacts 32, 33 over potentiometer coils 23, 24. Wiper blades 44, 45 are limited in angular travel by stops 51, 52 and after striking faces 49, 50 will slip one on the other. This would be an emergency condition in which something would have gone wrong with the air frame steering equipment and emergency action would be required to again put the equipment into useful operation.

As above noted the electric signals from potentiometer coils 23, 24 are picked up by wipers 32, 33, and transmitted by blades 44, 45, and wires 42, 43, to slip rings 40, 41, from where the signals are picked up respectively by flexible wire brushes 53, 54, insulatedly supported by brush holder 55 held by screws 56 to bracket 25.

Electromagnetic operator 57 for wiper carrier 31 is seen in FIGS. 1, 4 and 5 to include a solenoid frame 58 secured to the top of gyro frame 20 by screws 59 together with a solenoid coil 60, an axially movable armature 61 and a lever 62 liftably engaged at one end under the notched head of armature 61 and liftably engaged at the other end under the notched head of carrier 31. Near its armature 61 end, lever 62 is formed with a pair of transversely aligned downwardly open V notches 63 to form a fulcrum bearing with a matching pair of knife edges 64 formed upwardly on frame 58. Between its fulcrum bearing 63, 64 and its carrier 31 end, lever 62 is limited in motion in either direction about bearing 63, 64 by stop 65 adjustably positioned on frame 58 by screws 66. Tension spring 67 strained between clip 68 secured to frame 58 and clip 69 secured under lever 62 between bearings 63, 64, and stop 65 biases lever 62 toward rotation in the direction to lower its carrier 31 end and raise its armature 61 end. When the winding terminals 70, 71 of solenoid coil 60 are connected to an appropriate source of electric current coil 60 is energized to actuate solenoid armature 61 to rotate lever 62 to overcome the bias of spring 67 to raise carrier 31 to the position shown in FIG. 3. When the electric circuit to terminals 70, 71, of solenoid 60 is broken, the bias of spring 67 returns carrier 31 to the position shown in FIG. 2.

Referring to FIGS. 1, 6 and 7 it should be noted that in the top plan view of the potentiometer wiper carrier 31 in diametrical alignment with the centerline of the wiper blades 44, 45 an upwardly facing zero positioning cam face 72 is sunk to cooperate with cam follower roller 73 journalled on its axle 74 secured between vertical adjustment shims 75 and guide plate 76 to bracket 26 by screw 77. Also note that angular movement stops 51, 52 for wiper blades 44, 45 will prevent the cam 72 from overrunning the operational limits of the follower 73.

As seen in FIG. 3 magnetic washer 78 secured near the lower end of carrier 31 concentric therewith becomes a magnetic detent or keeper for permanent magnet 46 yieldingly to engage face 50 of carrier 31 with face 49 of bearing cup 29 which is a part of outer gimbal ring axle 19.

Thus when it is desired to put the directional gyro to use with a vehicle having a course correcting steering means compatible with the course condition signalling means provided with the gyro, like the potentiometer means here shown, it is understood that the potentiometer wiper positions on the potentiometers will be matched when the cam follower is bottomed at the nadir of the cam face. Then regardless of the recent service of the gyro when it is desired to put it into correct operation on a new course, it is only necessary to have the gyro wheel up to speed with its outer gimbal ring axle secured perpendicular to the selected line of forward motion when the vehicle is in forward motion on its desired course and to stay on the course only long enough for the reaction jets to precess the spin axis perpendicular to the vertical gimbal axis. Then with the vehicle on its desired course electric power is applied to terminals 70, 71 of solenoid 60 to cause armature 61 to pull lever 62 down to raise carrier 31 at surface 50 away from surface 49 of vertical axle 19 and further raise carrier 31 to zero cam face 72 onto cam follower 73 and then de-energize solenoid 60 to allow spring 67 with the aid of permanent magnet quickly to re-engage carrier 31 with vertical gimbal axle 19 at surface 49, 50, with the potentiometer thus zeroed in on the desired course of the vehicle.

Having recited some of the objects of this invention, illustrated and described a preferred form in which the invention may be practiced and explained its operation, I claim:

The combination of a directional gyro for signalling the divergence of a vehicle from a preset path in forward motion, said gyro and said vehicle including a common frame, said gyro including an outer gimbal ring supported on said frame on an outer gimbal ring axle for rotary motion in either direction about an outer gimbal ring axis, an inner gimbal ring supported on said outer gimbal ring on an inner gimbal ring axle for rotary motion in either direction about an inner gimbal ring axis perpendicular to said outer gimbal ring axis, a gyroscope wheel supported on said inner gimbal ring on a spin axle for rotary motion in a selected direction about a spin axis perpendicular to said inner gimbal ring axis, each of said three axes intersecting each other of said three axes at a common point at all times, together with means for continuously erecting said outer gimbal ring axis and said spin axis toward mutual perpendicularity, said gyro including means for rapidly referencing said forward direction of motion of said vehicle along said preset course to said spin axis about said outer gimbal ring axis and continuously signalling the divergence of the actual course followed by said vehicle from its preset course, said means including a potentiometer winding secured on said frame coaxially about said outer gimbal ring axis, a wiper for said potentiometer, said wiper including a carrier therefor, said carrier being rotatable about the outer gimbal ring axis to a position where the wiper is at rest on the neutral position of the potentiometer winding, said carrier being axially movable along the axle of said outer gimbal ring, a magnetic armature coaxially secured on the lower side of said carrier, a permanent magnet secured to the top of said frame coaxially with said armature magnetically to hold said carrier down onto said outer gimbal ring axle to rotate therewith, an electromagnet including lever means operable when energized to lift said carrier free from said permanent magnet and said outer gimbal ring axle, said carrier including a rotary top face face cam sunk into the top thereof, a horizontal axle roller cam follower positioned in the upward path of said face cam to rotate said carrier as said lever means lifts said carrier to rotate said potentiometer wiper to its neutral position on said potentiometer before said electromagnet is de-energized to release said carrier for reconnection by said magnet to said outer gimbal ring axle, said signalling means including said potentiometer and said wiper and electric means for energizing said potentiometer, and said referencing means including electric means for energizing said electromagnet.

References Cited in the file of this patent

UNITED STATES PATENTS

| | | |
|---|---|---|
| 1,295,003 | Chandler | Feb. 18, 1919 |
| 2,174,777 | Carter et al. | Oct. 3, 1939 |
| 2,951,378 | Seifried et al. | Sept. 6, 1960 |

FOREIGN PATENTS

| | | |
|---|---|---|
| 525,697 | Great Britain | Sept. 3, 1940 |